United States Patent [19]

Alexander et al.

[11] 4,373,434
[45] Feb. 15, 1983

[54] APPARATUS FOR THE EXPANSION OF OIL BEARING SEEDS

[75] Inventors: David G. Alexander; Ian J. Woolley, both of Hull, England

[73] Assignee: Simon-Rosedowns Limited, Hull, England

[21] Appl. No.: 209,690

[22] Filed: Nov. 24, 1980

[51] Int. Cl.³ .......................... B30B 9/18; B30B 11/24
[52] U.S. Cl. ........................................ 100/43; 100/117; 100/148; 100/909; 425/144; 425/466; 425/208; 260/412.2
[58] Field of Search ........ 100/111, 117, 129, 145-150, 100/909, 43, 45, 50; 425/143-145, 376 R, 376 A, 380, 463-467, 208, 209; 260/412.2

[56] References Cited

U.S. PATENT DOCUMENTS

| | | | |
|---|---|---|---|
| 3,009,412 | 11/1961 | Jung | 100/148 |
| 3,288,056 | 11/1966 | Ginaven | 100/148 X |
| 3,492,700 | 2/1970 | Kornmayer | 425/145 |
| 3,518,936 | 7/1970 | Bredeson | 100/117 |
| 3,797,808 | 3/1974 | Ma et al. | 425/145 X |
| 3,973,890 | 8/1976 | Porter et al. | 425/376 X |
| 4,024,168 | 5/1977 | Homann et al. | 100/117 X |

FOREIGN PATENT DOCUMENTS 457753  6/1949  Canada .................................. 100/909

*Primary Examiner*—Peter Feldman
*Attorney, Agent, or Firm*—LeBlanc, Nolan, Shur & Nies

[57] ABSTRACT

Apparatus for the expansion of oil bearing seeds and of the kind comprising at least one screw (11) rotatable in a barrel (10) for conveying seed through the barrel from one end to the other, there being a die plate (14) having orifices (15) therein at the output end of the barrel and through which the seed material is extruded by the action of the screw or screws, there being a plurality of throttle needles (17) having portions (19) of tapering cross-section and movable linearly with respect to said orifices thus to vary the effective cross-sectional area thereof in response to conditions within the barrel such as temperature as detected by a temperature sensor (22), the cylindrical wall of the barrel being either wholly plain or in part comprised by a plurality of circumferentially spaced axially extending bars forming a press cage, the position of the throttle needles ensuring control of the state of the seed material prior to extrusion through the die plate.

7 Claims, 4 Drawing Figures

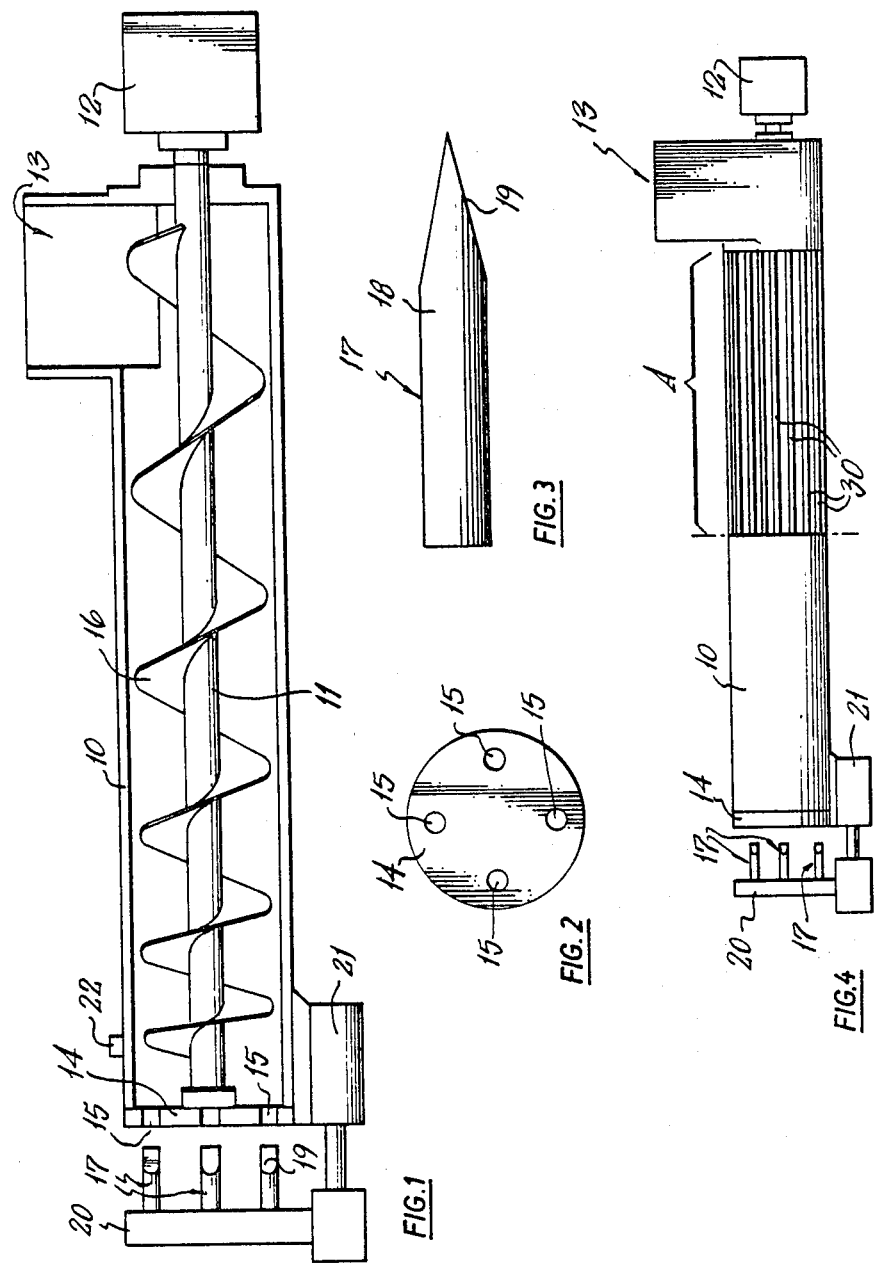

APPARATUS FOR THE EXPANSION OF OIL BEARING SEEDS

This invention concerns apparatus for the expansion of oil bearing seeds and of the kind comprising at least one screw rotatable in a barrel for conveying seed through the barrel from one end to the other, there being a die plate having orifices therein at the output end of the barrel and through which the seed material is extruded by the action of the screw or screws. In some cases, the pitch between the flights of the screw may decrease and/or the diameter of the shaft upon which the flights are mounted may increase in the direction in which the seed is conveyed, so to compress the seed during its passage through the barrel.

In apparatus of this kind the temperature of the seed material is raised by the mechanical working within the barrel to something in excess of 100° C., but contained water does not boil on account of the high pressure. Once the material is extruded through the orifices in the die plate, however, there is a sudden drop in pressure which allows the contained water to boil thus causing expansion of the material in known manner.

Apparatus of this kind has been found to be very effective in disrupting the cell structure of the seed thus making it highly susceptible to oil recovery by a solvent extraction technique.

However the apparatus is somewhat limited in its application. There appears to be a limited range of oil content, water content, and temperature over which the machine will render the seed or cake plastic and so cause it to extrude rapidly through the die and expand. On very oily seed there is such lubrication that insufficient heat is generated whilst on very dry seed there is a tendency for the apparatus to churn ineffectively or to stall.

When the apparatus is in operation it reaches an equilibrium state where the work done in the barrel in shearing the seed raises its temperature and this, together with the shearing action, causes the mass to become plastic and suitable for extrusion.

After an initial start-up period, the barrel may contain some seed which is not yet plasticised. Because it is not plastic it is only extruded with great difficulty and very slowly. The material in the barrel at this time is moving forward very slowly and therefore is very heavily worked and plasticised and may well be damaged by overheating. This will reach the die plate in a very fluid condition, and will therefore extrude very rapidly resulting in the material in the barrel being lightly worked and consequently poorly plasticised and difficult to extrude. It can be seen therefore that the apparatus will be difficult to control and will tend to be rustable in operation.

The present invention is based upon an appreciation of the possibility of reducing the time taken for apparatus of the kind referred to to reach a stable operating condition by the use of a control system. It will enable the apparatus to control the temperature at which seed is treated and so help to offset the changes in treatment which would result from small differences in the properties of different batches of seed of the same type. It is also readily adjusted to handle seeds of various types.

Thus, according to the present invention there is provided apparatus for the expansion of oil bearing seeds of the kind comprising at least one screw rotatable in a barrel for conveying seed through the barrel from one end to the other, and a die plate having orifices therein at the output end of the barrel and through which the seed material is extruded by the action of the screw or screws, characterised by throttle means associated with at least some of the orifices in the die plate to enable the effective area of cross-section thereof to be varied.

The invention will be further apparent from the following description with reference to the several figures of the accompanying drawings, which show, by way of example only, a number of forms of apparatus embodying the invention.

Of the drawings:

FIG. 1 shows a longitudinal cross-section through a first form of apparatus embodying the invention;

FIG. 2 shows an end view of the die plate of the apparatus of FIG. 1;

FIG. 3 shows a side view of one of the throttle devices associated with the die plate of FIG. 1; and FIG. 4 shows a view similar to that of FIG. 1, but of a modified form of apparatus.

Referring now to the drawings it will be seen that the first form of apparatus essentially comprises a cylindrical barrel 10 having a screw 11 rotatable therein under the action of a drive motor 12. The screw 11 serves to press and convey oil bearing seed introduced through an input chute 13 forwardly through the barrel 10 to a die plate 14 having orifices 15 of circular cross section therein.

In a known manner the screw 11 is provided with a helical flight 16 whose pitch decreases from the input to the output end of the barrel 10.

In accordance with the invention a throttle device is associated with each of the orifices 15. As best seen from FIG. 3 each throttle device is in the form of a needle 17 consisting of a rod 18 made to fit the bore of an orifice 15 with flats 19 ground into opposite sides thereof, the flats being of decreasing depth from the tip of the needle 17 to the base. The needles 17 are carried by a support plate 20 which can be advanced and retracted to move the needles 17 into and out of engagement with their associated orifices 15 by means of a double acting hydraulic ram 21. It will be understood that as the tapering portions of the needles are inserted into the orifices 15 against the flow of seed, the orifices will reduce gradually in cross-sectional area from their full circular section until they are completely closed.

A temperature sensor 22 on the barrel 10 detects the temperature produced by working the seed and adjusts the position of the plate 20 and hence needles 17 accordingly. If the temperature is lower than is desired the needles are advanced to restrict the orifices 15 and so increase the dwell time in the barrel 10 and the amount of work done on the seed. As the temperature rises the needles 17 are withdrawn and the dwell time is decreased.

Interconnected with the control system is a sensor for measuring currents taken by the main drive motor 12 of the apparatus. If these rise above a pre-set value, the needles 17 can be withdrawn from the orifices 15 to decrease the load on the motor.

The apparatus as described whilst useful for many varieties of seed is of little value for very oily seeds because the oil liberated as the seed is worked so lubricates the system that either the seed is extruded without being sufficiently heated, or the mass of seed will churn ineffectively in the barrel without developing sufficient pressure to be extruded.

This problem is overcome by a modified version of the apparatus as shown in FIG. 4 and wherein like parts are indicated by like reference numerals. In this version the length of the barrel 10 is extended to provide an initial zone indicated at A where the wall of the barrel is formed from a plurality of circumferentially spaced axially extending bars 30. In this zone A the seed is pressed in a conventional manner and oil expressed therefrom for flow through the apertures between adjacent bars 30 so that relatively dry seed enters the output section of the barrel 10 where it can be properly worked for an extrusion through the orifices 15.

The action of this apparatus is to subject the seed to increasing compression in the zone A and to expel some of the oil. The mechanical work done in zone A causes a rise in temperature of the seed and breaks up the cellular structure causing the seed to become more plastic. The seed entering the succeeding zone is already hot and somewhat plastic, consequently the power required to shear the mass in this zone is reduced. The reduced power required in this zone reduces the rise in temperature therein but the exit temperature is still sufficient to cause the water in the seed to boil when the pressure is released as it leaves the die orifices.

It will be appreciated that it is not intended to limit the invention to the above example only, many variations, such as might readily occur to one skilled in the art, being possible, without departing from the scope thereof.

Again, for example, the relative lengths of the zone A and the barrel 10 in an embodiment of the kind illustrated in FIG. 4, can be other than as shown in that Figure. Thus, there could be an extensive press cage section with bars 30, followed by a very short extruder section, e.g. little more than the die plate itself.

What is claimed is:

1. Apparatus for the expansion of oil bearing seeds of the kind comprising at least one screw rotatable in a barrel for conveying seed through the barrel from one end to the other, a die plate having orifices therein at the output end of the barrel and through which the seed material is extruded by the action of the screw or screws, a plurality of needles aligned with at least some of said orifices outside of said barrel and movable relative to the die plate thus to be inserted into the associated orifices at least partially to occlude same to enable the effective area of cross-section thereof to be varied.

2. Apparatus according to claim 1, wherein at least some of said needles have a portion of tapering cross-section whereby variation of the effective area of cross-section of said orifices can be effected by adjustment of the position of said tapering portions within said orifices.

3. Apparatus according to claim 1, wherein said needles have a portion of sufficiently large cross-sectional area to enable them completely to occlude the orifices in said die plate.

4. Apparatus according to claim 1, including drive means for moving said needles, and temperature sensing means associated with said barrel and connected to said drive means, whereby the position of the needles can be set in accordance with the temperature in the barrel detected by said sensing means.

5. Apparatus according to claim 1, wherein said barrel comprises a portion wherein the wall thereof is formed from a plurality of circumferentially spaced, axially extending bars.

6. Apparatus according to claim 5, wherein said portion constitutes an initial zone of said barrel through which the seed material passes before entering a portion having a plain cylindrical wall which latter portion terminates at said die plate.

7. Apparatus according to claim 6, wherein the different portions of the barrel so-formed, are of substantially equal length.

* * * * *